Oct. 19, 1954     M. M. HURST     2,692,214
VEHICLE WHEEL WASHING DEVICE AND METHOD
Filed Nov. 25, 1950     2 Sheets-Sheet 1
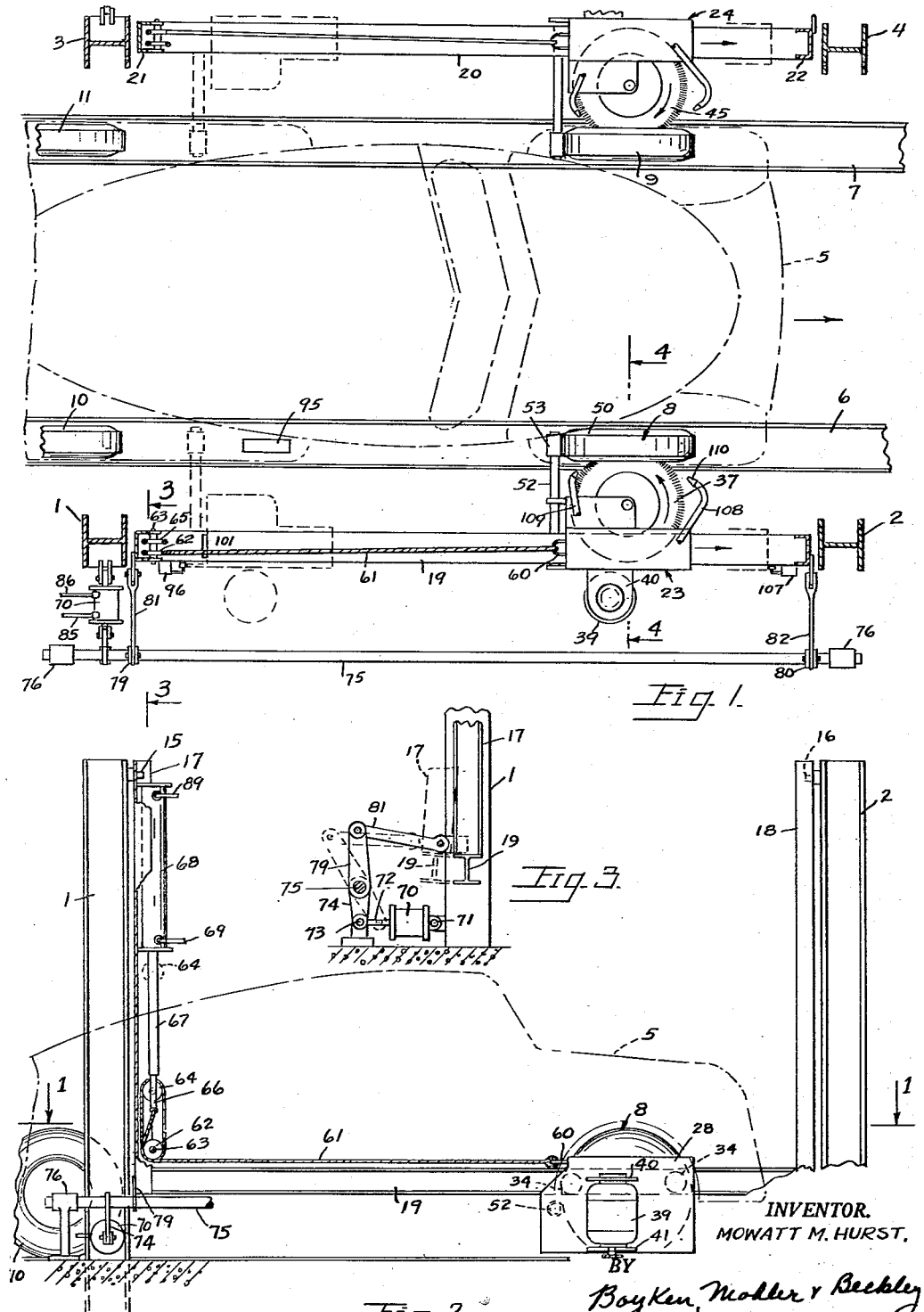
INVENTOR.
MOWATT M. HURST.
BY Boyken, Mohler & Beehler
ATTORNEYS Oct. 19, 1954   M. M. HURST   2,692,214
VEHICLE WHEEL WASHING DEVICE AND METHOD
Filed Nov. 25, 1950   2 Sheets-Sheet 2
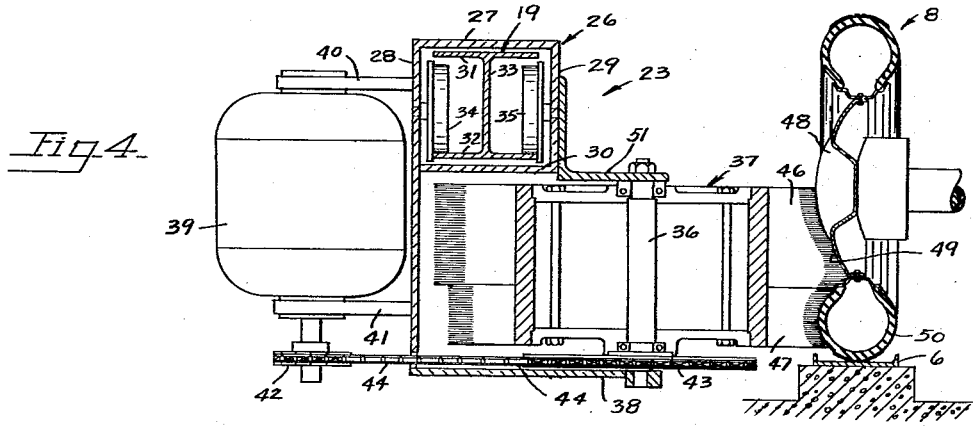
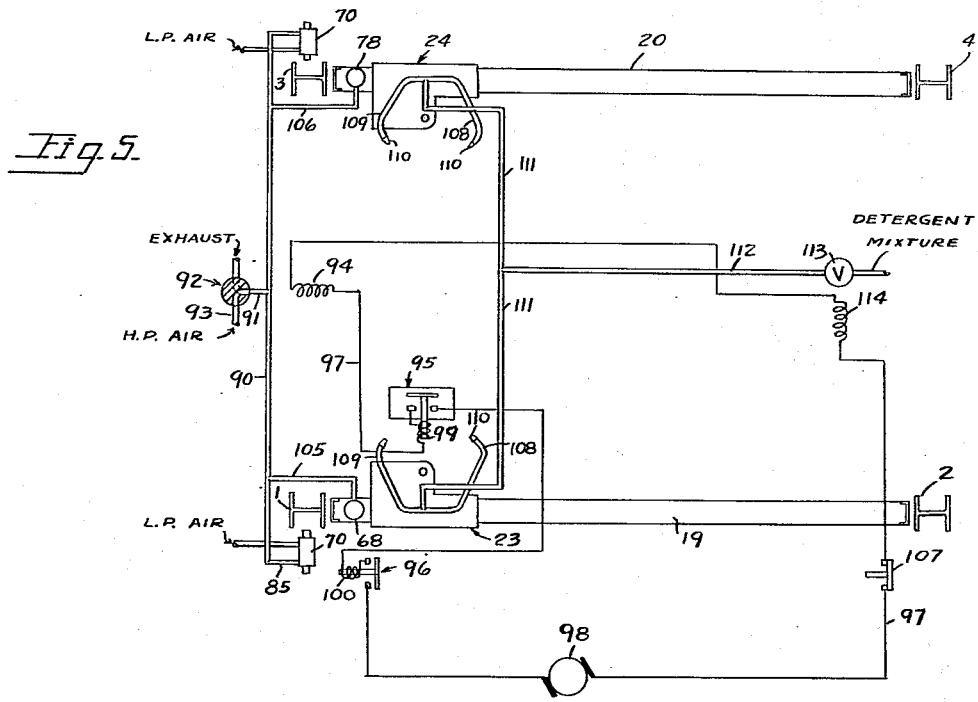
INVENTOR.
MOWATT M. HURST
BY
Boyken, Mohler & Beckley.
ATTORNEYS Patented Oct. 19, 1954

2,692,214

UNITED STATES PATENT OFFICE 2,692,214

VEHICLE WHEEL WASHING DEVICE AND METHOD

Mowatt M. Hurst, Redwood City, Calif.

Application November 25, 1950, Serial No. 197,556

15 Claims. (Cl. 134—6)

This invention relates to motor vehicle cleaning devices and methods and more particularly to an automatic device and method for cleaning the wheels of a motor vehicle as part of the general vehicle cleaning operation.

Automatic machinery has heretofore been provided for washing and drying motor vehicles but to my knowledge no satisfactory means has been provided for washing the wheels of such vehicles. Inasmuch as the wheels of a vehicle are relatively inaccessible, the manual operation of washing such wheels is difficult and time consuming. Furthermore, the wheels of a vehicle are more likely to become soiled than other exterior portions of a vehicle and therefore require hot water and strong detergents to remove dirt, grime and other road accumulations. This makes an automatic mechanical operation extremely desirable.

The main object of the present invention is therefore the provision of an automatic mechanical wheel washing device adapted to wash the wheels of a wheeled vehicle as the latter is moved along a path of travel during the general vehicle washing operation.

Another object of the invention is the provision of a simple mechanism for automatically washing the wheels of a wheeled vehicle and which device requires a minimum amount of floor space and which may be readily installed so as not to interfere with other washing processes on the vehicle.

Still another object is the provision of a wheel washing device which permits the wheel washing operation to continue for a relatively long period of time without interfering with other washing operations.

Yet another object is the provision of a wheel washing device for wheeled vehicles which may be employed to wash the wheels on both sides of the vehicle simultaneously and which requires only one control unit.

Another object is the provision of a simple washing device for washing the wheels of a wheeled vehicle which will operate satisfactorily regardless of shifting of such vehicles from the preferred path of travel normally established in motor vehicle washing installations.

Another object is the provision of a simple method of washing wheels of wheeled motor vehicles with a minimum of power.

Other objects and advantages will be apparent from the specification and from the drawings wherein:

Fig. 1 is a semi-schematic top plan view of the invention showing it in working position washing the front wheels of a motor vehicle. The vehicle body is indicated by dot-dash lines.

Fig. 2 is a semi-schematic side elevational view (partly broken away and in section) of the arrangement of Fig. 1 showing one side of the washing installation.

Fig. 3 is a fragmentary cross-sectional view through one track of the present invention showing the means for moving said track away from the vehicle.

Fig. 4 is an enlarged cross-sectional view through the carriage of the present invention and the rotary brush supported thereon showing the brush in cleaning engagement with a wheel of a vehicle.

Fig. 5 is a schematic piping and wiring diagram of the invention showing the invention in its starting position.

The mechanism of the present invention may be installed on any suitable supports in the building in which the wheel washing operation is to be carried out. However in the drawings, H-columns 1, 2, 3, 4 are shown for supporting the structure of the invention. Columns 1, 2 are positioned on the right side of the vehicle 5 as the latter moves from left to right in Fig. 1 and columns 3, 4 are positioned on the left side.

Conventional tracks 6, 7 are provided for receiving the wheels of the vehicle as the latter moves along a predetermined path of travel. In the drawing, these tracks are shown as upwardly opening channels, but angle bars or flat bars may be employed if desired so long as sufficient clearance is allowed to accommodate vehicles having different transverse wheel spacing.

The vehicle may be drawn along its path of travel in any conventional manner such as by a constantly travelling rope (not shown) to which the vehicle may be detachably secured. It is obvious that the vehicle may also be driven under its own power and the present invention will operate regardless of how the vehicle is moved.

The wheels of the vehicle are shown in full line in Figs. 1, 2, the front wheels being designated 8, 9 and the rear wheels 10, 11.

Adjacent the upper ends of the H-columns 1, 2 are pivots 15, 16 respectively to which are pivotally secured the upper ends of channel support members 17, 18 (Fig. 2). Extending between the support members 17, 18 at their lower ends and rigidly secured thereto as by welding is a track 19. It will be apparent that by such an arrangement the track 19 is suspended pendulum fashion for swinging about the pivots 15, 16 so that it may be moved in a direction transversely of the path of travel of the vehicle in a direction toward or away from the vehicle 5 as desired.

Similarly a track 20 is suspended by supports 21, 22 between the H-columns 3, 4 on the opposite side of the path of travel from the track 19.

These tracks 19, 20 are adapted to receive carriages 23, 24 respectively, which carriages are identical except that they are constructed to opposite hands and for this reason only carriage 23 will be described in detail. Furthermore the entire mechanism secured to H-columns 3, 4 is similar to the mechanism suspended between columns 1, 2 and only the latter mechanism will be described in detail.

As best seen in Fig. 4, the carriage 23 comprises a box-like housing 26 having a top side 27, lateral sidewalls 28, 29 and a bottom 30. This housing 26 is adapted to surround the track 19, which track is preferably an H-beam or I-beam having upper and lower flanges 31, 32 respectively and a central vertical web 33.

Rotatably secured to sidewalls 28, 29 respectively are wheels 34, 35 which support the carriage 23 for movement on flange 32 along the length of the track 19. The sidewall 29 which is on the inner side of the rail 19 or on the side nearer the vehicle 5 is provided with a bracket 51 which extends outwardly from the track 19. Rotatably secured to the outer end of this bracket 35 is the upper end of a shaft 36 to which a relatively large rotary brush 37 is fixedly secured. The lower end of the shaft 36 is rotatably supported at the outer end of a bracket 38 which in turn is secured to the outer side 28 of the housing 26.

As best seen in Figs. 2, 4, the outer side 28 of the carriage housing 26 extends downwardly beyond the lower end of the brush 37. Secured to this side 28 on the side of the housing opposite from the brush 37 is an electric motor 39 which is secured in a vertical position to the side 28 by means of brackets 40, 41. A sprocket wheel 42 secured to the output shaft of the motor 39 serves to drive a somewhat larger sprocket wheel 43 on the brush shaft 36 through chain 44.

The brush 37 may be of any desired conventional type and no claim is made to such brush aside from its use in combination with the present invention. However, the bristles of brush 37 should be disposed so as to rotate in a horizontal plane to engage wheel 8 of the vehicle 5 at points below the wheel axis. Preferably the brush 37 includes two groups of bristles, an upper group 46 and a lower group 47. The upper group 46 is adapted to engage that portion of the wheel 8 which includes one half of the hub cap 48 and the portion 49 between the hub cap 48 and the tire 50. It will be understood, of course, that the brush may be modified as desired to engage only the tire in the event that the fender is provided with a sheet metal guard, as is the case in some motor vehicles.

Rigidly secured to the housing 26 and extending outwardly therefrom toward the wheel 8 is a rod 52 (Fig. 1). Rotatably secured to the outer end of this rod is a roller 53 which is adapted to engage the rear side of the tire 50 (Figs. 1, 2).

It will be apparent from Fig. 1 when the brush 37 is driven in a counter-clockwise direction while in engagement with the wheel 8 that the said brush will tend to move away from the wheel in the direction of travel of the vehicle by virtue of the reaction of the bristles against said wheel inasmuch as the carriage 23 is floatingly mounted on the track 19 by wheels 34, 35. The roller 53 on the end of rod 52 thus acts as a stop to prevent such movement of the carriage away from the wheel 8.

Similarly when brush 45, which is mounted on carriage 24 is driven in a clockwise direction, the same result will be achieved.

Secured to the rear end of housing 23 is a staple 60 or other suitable device to which is secured one end of a flexible rope 61 which extends rearwardly along the track 19 to a sheave 62. In this connection the words "rear" and "rearwardly" refer to the direction of travel of the vehicle 5, the latter travelling forwardly at all times. The sheave 62 is rotatably supported at the lower end of support channel 17 on a horizontal shaft 63 which may be fastened at its ends to the legs of the channel 17. The rope 61 extends around the sheave 62 and upwardly around another sheave 64 and then downwardly and around sheave 65 which is also rotatably supported on shaft 63. The rope 61 then extends upwardly and is secured at its end to the cheek plates 66 of the upper sheave 64 in the usual manner to provide a ratio of three between the travel of the carriage and the travel of the sheave 64.

The cheek plates 66 between which the upper sheave 64 is rotatably secured are fastened to the lower end of a vertically extending piston rod 67. This piston rod 67 is secured at its upper end to a piston (not shown) within air cylinder 68 which in turn may be rigidly secured in any suitable manner to the support channel 17. The cylinder 68 is provided at its lower end with an air inlet 69 for introducing air under pressure into the cylinder 68 for moving the connecting rod 67 upwardly. The means for introducing air to the cylinder 68 will subsequently be described, and at this point it is only necessary to note out that upward movement of the piston 67 will cause rearward movement of the carriage 23. Also it will be apparent that the carriage 23 will travel three times the distance the piston 67 travels by virtue of the three part purchase described above.

By the present invention the track 19 may be moved toward and away from the vehicle 5 by swinging said track about the pivots 15, 16 at the upper ends of the columns 1, 2. In this manner the brush 37 may be moved into and out of engagement with the wheel of the vehicle as desired. It is preferable that the brush 37 be permitted to engage the wheel backed up by the force of gravity of the track 19 and the associated structure suspended from pivots 15, 16. By this arrangement the brush is gravity fed into engagement with the wheel and is disengaged by power means acting on the track 19. This power means will now be described.

An air cylinder 70 is positioned adjacent the base of the H-column 1 and on the side opposite the vehicle 5 (Figs. 1, 2). This air cylinder is pivotally supported at one end to the column 1, as at 71, to permit a slight amount of swinging of said cylinder. The opposite end is provided with a piston rod 72 which is pivotally secured at its outer end as at 73 to the lower end of a vertical arm 74. This arm 74 is rigidly secured at its upper end to horizontally extending shaft 75 which is rotatably supported at its ends in bearings 76 (Figs. 1, 2).

Secured at spaced points along the length of shaft 75 are a pair of upwardly directed arms 79, 80 which are pivotally secured at their upper ends to the corresponding ends of a pair of horizontal arms 81, 82 respectively, which in turn are secured adjacent the lower ends of the channel supports 17, 18. It will be apparent from Figs. 1, 2 and 3 upon inward movement of the piston rod 72 that the track 19 will be swung outwardly to the dotted line position of Fig. 3, thereby disengaging the brush 37 from the wheel 8 and permitting movement of the carriage 23 along the track 19 clear of the vehicle 5. For this purpose air is introduced into the cylinder 70 through inlet 85 at the end of the cylinder adjacent the piston rod 72 (Fig. 1). The opposite end of the cylinder is provided with an air inlet 86 for introducing low pressure air into the cylinder at all times in opposition to the high pressure air entering through inlet 85. The purpose of the low pressure air is to aid in overcoming the friction of the various parts when it is desired to swing the track 19 inwardly by gravity toward the vehicle 5. Thus, when the track 19 is in the dotted line position of Fig. 3, and it is desired to swing the track 19 inwardly to permit the brush 37 to engage a wheel of the vehicle 5, it is merely necessary to shut off the high pressure air entering cylinder through inlet 85 and exhaust the cylinder through inlet 85 to the atmosphere. The track 19 with the carriage 23 will then swing downwardly and inwardly toward the vehicle 5 by gravity. The constant introduction of low pressure air through inlet 86 overcomes any friction present in the various parts and quickly and positively causes the desired inward swinging of the track 19.

It should be understood that the low pressure air transmits sufficient force to the brush to hold it against the wheel to prevent any lateral shifting movement of the vehicle. In addition, the force of gravity on the tracks 19, 20 is exerted against the wheel so that upon lateral movement of the wheel in either direction from its path of travel the brush 37, together with the carriage 23 and the track 19, will float inwardly and outwardly maintaining the brush in cleaning engagement with the wheel regardless of such shifting of the vehicle.

In operation, with particular reference to the schematic arrangement shown in Fig. 5, when the front wheels of the vehicle approach the apparatus, the tracks 19, 20 will be in the outer position shown in dotted line in Fig. 3. In such a case, the pistons of the air cylinders 70 will be withdrawn because of the air pressure applied to the piston in cylinders 70. This pressure is supplied through pipe 90 which is connected by means of a branch 91 with a conventional three-way solenoid valve 92 (Fig. 5). When the valve 92 is in the position shown in Fig. 5, high pressure air from a suitable compressor (not shown) enters the valve through line 93 and then to the pipe 90 through branch 91 supplying such high pressure air to the cylinders 70.

Upon energizing of the solenoid valve 92 by solenoid 94 the port arrangement of the valve will be changed to the dotted line position of Fig. 5 thus exhausting the cylinders 70 to the atmosphere. This energizing of the solenoid 94 is accomplished through switches 95, 96, which close a circuit 97 to the source of power 98. Switch 95 is a treadle switch and is closed by the front right wheel of the vehicle (Figs. 1, 5). Switch 96 is a limit switch which is closed by the carriage 23 when the latter is in the dotted line position of Fig. 1 and the full line position of Fig. 5. It will be noted in this connection that the track 19 cannot swing inwardly toward the vehicle 5 unless the carriage 23 has been returned to its starting position, at the end of the track 19 (Figs. 1, 5). Switches 95, 96 are provided with holding coils 99, 100 respectively for keeping the circuit 97 closed. A stop 101 is provided on track 19 for engaging the carriage 23 and for establishing its starting position.

Simultaneously with the exhausting of cylinders 70 to the atmosphere, the cylinders 68, 78 will also be exhausted. The upper end of cylinders 68, 78 is of course vented at all times to the atmosphere through vents 89. Referring to Fig. 5, it is seen that the branches 105, 106 connect pipe 90 with the cylinders 68, 78 respectively so as to effect simultaneous action of track actuating cylinders 70 and the carriage actuating cylinders 68, 78.

Thus, it is apparent that upon engagement of switch 95 by the right front wheel of the vehicle 5, the tracks 19, 20 will be immediately swung inwardly by gravity so that the brushes 37, 45 will engage the front wheels 8, 9 of the vehicle 5 respectively (Fig. 1). These brushes 37, 45 are rotating at all times in the direction indicated (Fig. 1) and by virtue of such rotation and the reaction of the bristles on the wheels of the vehicle, the carriages 23, 24 will move forwardly with the wheels and will be held alongside said wheels by the rods 52 as explained above. It should be noted in this connection that the carriage actuating cylinders 68, 78 will offer a slight amount of drag due to friction, and such drag will resist the forward motion of the carriages. However, there is no air pressure on these cylinders to offer any positive resistance, and the slight amount of friction is not undesirable, the reaction of the brushes 37, 45 being great enough to more than offset the same.

The travel of the carriages 23, 24 in the forward direction is preferably slightly more than the circumference of the vehicle wheels so that the entire wheel may be adequately cleaned. However the track 19 may be obviously varied in length as desired.

After the carriage 23 has travelled approximately the length of the track 19 it engages a limit switch 107 (Figs. 1, 5) which opens the circuit 97 de-energizing solenoid 94 and the holding coils of switches 95, 96 and actuating solenoid valve 92 to apply pressure to both the track actuating cylinders 70 and the carriage actuating cylinders 68, 78. The result is that the track is swung outwardly to the dotted line position of Fig. 3 and the carriage is returned to its starting position indicated by dotted lines in Fig. 1 and full lines in Fig. 5.

I have found that the cylinders 68, 78 may be thus actuated to return the carriage to its starting position simultaneously with the actuation of the track actuating cylinders 70 without any interference between the carriage mechanism and the vehicle. This desirable result obtains partly from the fact that the rod 52 need only move a slight amount to clear the wheel and partly from the fact that there is some slack in the rope 61 and its associated sheaves.

As best seen in Fig. 1, the length of travel of the carriage 23 should be such that the carriage may be returned to its starting position the rear wheel of the vehicle actuates the treadle switch 95 to initiate the above described operation again on the rear wheel. In this connection advantage is taken of the fact that most motor vehicles have a wheel base distance between front and rear wheels greater than the circumference of a wheel including the tire so that, by the present invention, front and rear wheels may be successively cleaned.

It is preferable that hot water mixed with a strong detergent be directed on the wheels during the washing operation. The spraying of this water and detergent may be accomplished automatically by the present invention. Mounted on top of the carriages 23, 24 in any suitable manner are a pair of spray pipes 108, 109 (Figs. 1, 5) which are provided with nozzles 110 for directing the spray on the wheel just ahead of the point of engagement with the brush and during such engagement. These spray pipes 108, 109 are supplied with detergent through pipes 111, 112, and the latter pipe is provided with a solenoid valve 113 actuated by a solenoid 114 in circuit 97 hereinbefore described. When the brush is in engagement with a wheel, the solenoid 114 will be energized along with solenoid 94, thus opening the valve 113 and supplying detergent to the wheel. Upon actuation of the limit switch 107, the solenoid 114 will be deenergized to close valve 113 and cut off the flow of detergent. The pipes 111 are of course flexible so that they may follow the carriage.

The invention herein described has been employed with great success in washing vehicles. The operation is completely automatic and no attention is required during use, it being only necessary to insure a constant supply of air or other operating medium and a supply of detergent mixture.

A slight amount of lateral movement of the vehicle from a predetermined central path of travel will not affect the operation of the device inasmuch as the brush is floatingly supported against the wheel and gravity fed against the wheel at all times. In the event that the travel of the vehicle through the washing line is hesitant and the vehicle stops from time to time, the operation of the brush will continue regardless of such interruptions.

It will be apparent that practically no floor space is required for the installation of the invention in a motor vehicle washing line and its installation does not interfere with other washing operations which may be performed on the vehicle at the same time.

The symmetrical arrangement on each side of the vehicle lends itself to a single controlling unit with a corresponding saving in materials. It should be noted in this connection that the switches 95, 96 and 107 are installed on one side only, the other side being controlled by the same switches.

The exact embodiment of the invention herein described in detail should not be taken as a limitation of the invention as it is obvious that changes in design may be made without departing from the spirit of the invention, and it is to be understood that the term wheel or wheels as used to designate one or more of the ground wheels of the vehicle is inclusive of the tire, rim, spokes, or disc, and hub cap of each wheel.

I claim:

1. The method of cleaning a ground wheel of a wheel mounted vehicle which comprises the steps of: supporting said vehicle for movement on its ground wheels along a horizontally extending path of travel in one direction and so moving said vehicle, supporting a rotary brush with its axis of rotation vertical in a position alongside said path for bodily movement parallel with said path in said one direction, urging said brush into frictional engagement with a side of said wheel during said movement and with the direction of travel of said brush at its point of engagement with said wheel opposite to the direction of travel of said vehicle thereby effecting bodily movement of said brush in the direction of travel of said vehicle under the influence of the reactive force of friction between said brush and said wheel, and holding said brush in said frictional engagement with said wheel during said movement of said vehicle until the latter has completed one revolution on its axis.

2. The method of cleaning a ground wheel of a wheel mounted vehicle which comprises the steps of: supporting said vehicle for movement on its ground wheels along a horizontally extending path of travel in one direction; supporting a rotary brush with its axis of rotation substantially vertical for bodily movement alongside said path in said one direction and for movement into engagement with said ground wheel at a point below the axis of rotation of the latter; substantially simultaneously moving said vehicle in said one direction and moving said brush into said engagement with said wheel and rotating said brush about its vertically extending axis so that its direction of movement at its said point of engagement with said wheel is opposite to the direction of movement of said vehicle whereby the reaction of said brush against said wheel will tend to bodily move said brush in the direction of travel of said vehicle during its engagement with said wheel and permitting said bodily movement of said brush in said one direction under the reactive influence of said brush against said wheel.

3. The method of cleaning a ground wheel of a wheel mounted vehicle which comprises the steps of: supporting said vehicle for movement on its ground wheels along a horizontally extending path of travel in one direction; supporting a rotary brush with its axis of rotation substantially vertical for bodily movement alongside said path in said one direction and for movement into engagement with said ground wheel at a point below the axis of rotation of the latter; substantially simultaneously moving said vehicle in said one direction and moving said brush into said engagement with said wheel and rotating said brush about its vertically extending axis so that its direction of movement at its said point of engagement with said wheel is opposite to the direction of movement of said vehicle whereby the reaction of said brush against said wheel will tend to bodily move said brush in the direction of travel of said vehicle during its engagement with said wheel and permitting said bodily movement of said brush under the reactive influence of said brush against said wheel and holding said brush to said wheel for said bodily movement in said one direction at substantially the same rate of travel as that of said vehicle.

4. The method of cleaning a ground wheel of a wheel mounted vehicle which comprises the steps of: supporting said vehicle for movement on its ground wheels along a horizontally extending path of travel in one direction; supporting a rotary brush with its axis of rotation substantially vertical for bodily movement alongside said path in said one direction and for movement into engagement with said ground wheel at a point below the axis of rotation of the latter; substantially simultaneously moving said vehicle in said one direction and moving said brush into said engagement with said wheel and rotating said brush about its vertically extending axis so that its direction of movement at its said point of engagement with said wheel is opposite to the direction of movement of said vehicle whereby the reaction of said brush against said wheel will tend to bodily move said brush in the direction of travel of said vehicle during its engagement with said wheel, and permitting said bodily movement of said brush under the reactive influence of said brush against said wheel and applying a retarding force to said brush for preventing bodily movement of said brush past said wheel in the direction of travel of said vehicle.

5. The method of cleaning a ground wheel of a wheel mounted vehicle which comprises the steps of: supporting said vehicle for movement on its ground wheels along a horizontally extending path of travel in one direction, floatingly supporting a rotary brush with its axis of rotation substantially vertical for bodily movement alongside said path in said one direction and for movement into engagement with said ground wheel at a point below the axis of rotation of the latter, moving said vehicle in said one direction, moving said brush into said engagement with said wheel at said point, causing said brush to move bodily in said one direction by rotating said brush about its axis of rotation so that its direction of movement at said point is opposite to the direction of travel of said vehicle, and yieldably holding said brush in engagement with said wheel until said wheel has completed one revolution about its axis.

6. The method of cleaning the two coaxial front and the two coaxial rear wheels of a four wheeled vehicle which comprises the steps of: supporting said vehicle for movement on its said ground wheels along a horizontally extending path in one direction with said front wheels leading the rear ones, supporting a pair of rotary brushes with their axes substantially vertical for bodily movement with said vehicle at opposite sides of said path and for movement into engagement with the oppositely outwardly facing sides of said wheels at similar points below the axis of rotation of said front wheels, moving said vehicle in said one direction, moving said brushes into engagement with said front wheels at said points, causing said brushes to move bodily with said vehicle in said one direction by rotating said brushes about their said axes so that their directions of movement at said points in opposite to the direction of travel of said vehicle, yieldably holding said brushes into engagement with said front wheels until they have completed one revolution about their axes, then quickly moving said brushes bodily opposite to the direction of travel of said vehicle and moving them into engagement with said rear wheels at points corresponding with their points of engagement with said front wheels during revolution of said brushes and during said movement of said vehicle and holding said brushes in engagement with said rear wheels at the said points thereon until said rear wheels have completed one revolution about their axes.

7. The method of cleaning two spaced pairs of coaxial ground wheels on a four wheeled vehicle which comprises the steps of: supporting said vehicle for movement along a horizontally extending path of travel in one direction with one pair of said wheels following the other pair in tracking relationship, supporting a pair of brushes along opposite sides of said path for bodily movement longitudinally of and in engagement with the oppositely outwardly facing sides of the leading pair of said wheels, rotating said brushes on their axes and moving them with said vehicle in said engagement with said leading pair of wheels until said leading wheels have made one complete revolution over a predetermined portion of said path, then quickly moving said brushes into engagement with the oppositely outwardly facing sides of the trailing wheels of said pair while said vehicle is moving in said path and when said trailing wheels are at substantially the beginning of said predetermined portion of said path and bodily moving said brushes along said portion to the end thereof and during one revolution of said trailing wheels, and holding said brushes in engagement with said trailing wheels during their movement therewith.

8. Apparatus for cleaning the wheels of a wheeled vehicle moving on its wheels along a horizontal path of travel comprising a rotary brush supported with its axis substantially vertical for bodily movement in a direction parallel to said path a distance about equal to the circumference of a wheel of said vehicle and for movement transversely of said path into engagement with a wheel of said vehicle, means for so supporting said brush, means for automatically moving said brush into such engagement at a point along said path of travel during movement of said vehicle, means for rotating said brush on its said axis with the portion in engagement with said wheel moving in a direction opposite to the direction of travel of said vehicle whereby said brush will be moved in a direction parallel to said path during such engagement.

9. Apparatus for cleaning the wheels of a wheeled vehicle moving along a horizontal path of travel comprising a rotary brush supported with its axis generally vertical for bodily movement in a direction parallel to said path a distance about equal to the circumference of a wheel of said vehicle and for movement transversely of said path into engagement with a wheel of said vehicle, means for so supporting said brush, means for automatically moving said brush into such engagement at a point along said path of travel during movement of said vehicle, means for rotating said brush about its said axis with the portion in engagement with said wheel moving in a direction opposite to the direction of travel of said vehicle whereby said brush will be moved in a direction parallel to said path during such engagement, and means for automatically moving said brush out of engagement with said wheel after movement of said brush a predetermined distance from said point.

10. Apparatus for cleaning the wheels of a wheeled vehicle comprising: supporting means for supporting such vehicle for movement along a horizontal path of travel with its wheels rolling on said means, a horizontally extending track supported alongside said path for movement transversely of the latter toward and away from a vehicle on said means, means for so supporting said track, a carriage moveable longitudinally of said track and thereon, a rotary brush supported on said carriage with its axis generally vertical and positioned to engage a wheel of said vehicle moving on said supporting means at a point along said path when said track is moved toward such vehicle, means for rotating said brush in a direction in which the portion in engagement with said wheel is moving in a direction opposite to the direction of movement of said vehicle whereby said carriage will be moved along said track while said brush is in engagement with said wheel.

11. Apparatus for cleaning the wheels of a wheeled vehicle comprising: supporting means for supporting said vehicle for movement along a horizontal path of travel with its wheels rolling on said means, a track supported alongside said means for movement transversely of said track toward and away from a vehicle on said means, a carriage on said track moveable longitudinally thereof, a rotary brush supported on said carriage with its axis generally vertical and positioned to engage a wheel of such vehicle at a point along said path when said track is moved toward said vehicle, and a vehicle is on said supporting means, means for rotating said brush about its axis with the portion thereof adapted to engage said wheel moving in a direction opposite to the direction of movement of said vehicle whereby said carriage will be moved along said track under the reactive influence of the engagement of said brush with said wheel while said brush is in engagement with said wheel, a stop on said carriage engageable with the rearwardly directed side of said wheel relative to the direction of travel of said vehicle for preventing movement of said brush away from said wheel in the direction of travel of said vehicle during such engagement.

12. Apparatus for cleaning the wheels of a wheeled vehicle comprising: means for moving such vehicle along a horizontal path of travel with its wheels rolling on a supporting surface, a track supported alongside and extending parallel to said path for movement transversely of the latter toward and away from said vehicle, a carriage moveable longitudinally of said track, a brush supported on said carriage and adapted to engage a wheel of said vehicle at a point along said path when said track is moved toward said vehicle, means for rotating said brush with the portion in engagement with said wheel moving in a direction opposite to the direction of movement of said vehicle whereby said carriage will be moved along said track while said brush is in engagement with said wheel, a stop on said carriage engageable with said vehicle for preventing movement of said brush away from said wheel in the direction of travel of said vehicle during such engagement, and means for moving said track away from said vehicle for disengaging said brush from said wheel when said carriage has travelled a predetermined distance along said path.

13. Apparatus for cleaning the wheels of a wheeled vehicle comprising: means for moving such vehicle along a horizontal path of travel with its wheels rolling on a supporting surface, a track supported alongside and extending parallel to said path for movement transversely of the latter toward and away from said vehicle, a carriage moveable longitudinally of said track, a brush mounted on said carriage for rotation with the bristles of said brush rotating in horizontal planes, said brush being adapted to engage a wheel of said vehicle at a point along said path when said track is moved toward said vehicle, means for rotating said brush with the bristles in engagement with said wheel moving in a direction opposite to the direction of movement of said vehicle whereby said carriage will be moved along said track while said brush is in engagement with said wheel, means for automatically moving said track away from said vehicle for disengaging said brush from said wheel after said carriage has moved a predetermined distance from said point and means for returning said carriage to said point.

14. Apparatus for cleaning the wheels of a wheeled vehicle comprising: means for moving such vehicle along a horizontal path of travel with its wheels rolling on a supporting surface, a track supported alongside and extending parallel to said path for movement transversely of the latter toward and away from said vehicle, a carriage moveable longitudinally of said track, a brush mounted on said carriage for rotation with the bristles of said brush rotating in a horizontal plane, said brush being adapted to engage a wheel of said vehicle at a point along said path when said track is moved toward said vehicle, means for rotating said brush with the bristles in engagement with said wheel moving in a direction opposite to the direction of movement of said vehicle whereby said carriage will be moved along said track while said brush is in engagement with said wheel, means for automatically moving said track away from said vehicle for disengaging said brush from said wheel after said carriage has moved a predetermined distance from said point and means for returning said carriage to said point, said track being suspended for swinging about a horizontal axis for movement toward and away from said vehicle, power means for swinging said track away from said vehicle and means for automatically disconnecting said power means when said wheel has reached said first mentioned point whereby said track will swing toward said vehicle by gravity for engaging said wheel by said brush.

15. Apparatus for cleaning the pairs of tracking, coaxial, similar sized ground wheels of a wheel mounted vehicle comprising: a pair of rotary brushes, carriages supporting said brushes with their axes generally vertical and spaced apart substantially the width of such vehicle, elongated supporting means for supporting a vehicle for rolling on its ground wheels longitudinally of said means between said brushes with said ground wheels at a level for engagement of the opposite outwardly facing sides of said pairs of ground wheels at points below their axes of rotation when a vehicle is on said supporting means, means for rotating said brushes, means supporting said carriage for movement longitudinally of said supporting means at the same rate of speed as that of a vehicle movable between said brushes when a vehicle is moved over said supporting means, means for yieldably holding said brushes in engagement with a pair of said wheels when a vehicle is moved over said supporting means, said carriages being movable with said vehicle under the influence of the frictional engagement between said brushes and such latter pair of wheels, power means for moving said carriages back to their initial starting point upon said movement with such vehicle a distance substantially equal to the circumference of one of the wheels of said pair, and control means operatively connected with said carriages for automatically causing said return movement to said starting point.

References Cited in the file of this patent

UNITED STATES PATENTS

| Number | Name | Date |
|---|---|---|
| 1,412,732 | Young | Apr. 11, 1922 |
| 1,749,822 | Lakeman | Mar. 11, 1930 |
| 1,767,420 | Wilson | June 24, 1930 |
| 1,827,887 | Gillespie | Oct. 20, 1931 |
| 2,025,780 | Rosebrook | Dec. 31, 1935 |
| 2,129,019 | Mulvihill | Sept. 6, 1938 |
| 2,236,813 | Evans | Apr. 1, 1941 |
| 2,257,255 | Yingling | Sept. 30, 1941 |
| 2,579,866 | Rousseau | Dec. 25, 1951 |